United States Patent
Wu et al.

(10) Patent No.: US 9,371,475 B2
(45) Date of Patent: Jun. 21, 2016

(54) GEL TIME CONTROLLABLE TWO PART EPOXY ADHESIVE

(71) Applicants: HENKEL (CHINA) COMPANY LIMITED, Shanghai (CN); HENKEL AG & CO. KGAA, Duesseldorf (DE); Henkel IP & Holding GmbH, Duesseldorf (DE)

(72) Inventors: Haiping Wu, Shanghai (CN); Rainer Schoenfeld, Duesseldorf (DE); Nigel Fay, Kill (IE); Jingfen Zhang, Pudong Shanghai (CN)

(73) Assignees: Henkel IP & Holding GmbH, Duesseldorf (DE); Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 14/251,234

(22) Filed: Apr. 11, 2014

(65) Prior Publication Data

US 2014/0221532 A1 Aug. 7, 2014

Related U.S. Application Data

(63) Continuation of application No. PCT/CN2012/082794, filed on Oct. 11, 2012, and a continuation of application No. PCT/CN2011/080626, filed on Oct. 11, 2011.

(51) Int. Cl.
| | |
|---|---|
| C09J 163/00 | (2006.01) |
| C09J 11/04 | (2006.01) |
| C08G 59/40 | (2006.01) |
| C08G 59/66 | (2006.01) |

(52) U.S. Cl.
CPC ........... *C09J 163/00* (2013.01); *C08G 59/4007* (2013.01); *C08G 59/66* (2013.01); *C09J 11/04* (2013.01)

(58) Field of Classification Search
CPC .... C08G 59/4007; C08G 59/66; C09J 163/00
USPC .......................................................... 523/466
See application file for complete search history.

(56) References Cited

U.S. PATENT DOCUMENTS

| | | | | |
|---|---|---|---|---|
| 6,313,257 | B1 * | 11/2001 | Abbey | ........................... 528/109 |
| 6,653,371 | B1 | 11/2003 | Burns et al. | |
| 8,268,932 | B2 | 9/2012 | Jansen et al. | |
| 2009/0008834 | A1 | 1/2009 | Yamauchi et al. | |
| 2010/0197848 | A1 * | 8/2010 | Verghese et al. | ............... 524/502 |
| 2010/0273940 | A1 | 10/2010 | Urakawa et al. | |
| 2010/0292415 | A1 * | 11/2010 | Reynolds et al. | .............. 525/533 |
| 2011/0077328 | A1 * | 3/2011 | Valette et al. | .................. 523/400 |

FOREIGN PATENT DOCUMENTS

| | | |
|---|---|---|
| CN | 1288481 | 3/2001 |
| CN | 1993399 | 7/2007 |
| CN | 101283018 | 10/2008 |
| JP | 2500526 | 2/1990 |
| JP | 21693/1992 | 1/1992 |
| JP | 2692031996 | 10/1996 |
| JP | 2009-19231 | 8/2009 |
| WO | 99/54373 | 10/1999 |

OTHER PUBLICATIONS

International Search Report issued in connection with PCT/CN2012/082794 mailed on Jan. 24, 2013.
Sosetsu Epokishi Jushi (General Reviews Epoxy Resins) (vol. 1, Basic Edition, published on Nov. 19, 2003 on p. 204 (Non English language available).
ASTM D3532-99.
ASTM D 3161.

* cited by examiner

*Primary Examiner* — Randy Gulakowski
*Assistant Examiner* — Christopher M Rodd
(74) *Attorney, Agent, or Firm* — Steven C. Bauman

(57) ABSTRACT

The present invention provides a gel time controllable epoxy adhesive, which includes a first part comprising an epoxy resin containing two or more epoxy groups in one molecule, and a second part comprising a thiol curing agent, wherein a peroxide is comprised in part A, part B and/or a third separate part C.

5 Claims, No Drawings

GEL TIME CONTROLLABLE TWO PART EPOXY ADHESIVE

FIELD OF THE INVENTION

This invention relates to an epoxy adhesive comprising at least two parts, a method to extend the gelling time of such an adhesive and a method for preparing the same.

BACKGROUND OF THE INVENTION

Compounds having two or more thiol groups in one molecule readily react with epoxy resins, urethane resins or the like by mixing them with such resins and become cured products, and therefore, they have been widely used for sealing materials, coating materials, adhesives, etc. For example, various polythiol-based curing agents are described as low-temperature curing agents on page 204 of "Sosetsu Epokishi Jushi (General Reviews Epoxy Resins)" (Vol. 1, Basic Edition, published on Nov. 19, 2003). Conventional polythiol-based epoxy adhesives with tertiary-amine curing agents, however, have a clear shortcoming that when such a curing agent is mixed with an epoxy compound and a curing assistant at ordinary temperature to form an epoxy resin composition, the gel time of the composition is as short as 3 minutes to 5 minutes and curing is initiated in the course of preparation of the composition, though the curing agent shows excellent curability at low temperatures. Thus, it was rather difficult to control the gel time of adhesives based on epoxy-thiol systems. The gel time is either so long in case of not using curing accelerator, or so short when using curing accelerator. As a result, the working conditions of epoxy-thiol adhesives were restricted.

There are not related references reported about how to control the gel time of the thiol-amine curing system, some patents have mentioned this problem as following:

In US patent No. US 2010/0273940 A1, there is disclosed a curing agent for epoxy resins, which contains a thiol compound having a branch (substituent) on a carbon atom at the α position to a thiol group (—SH), and one compound epoxy resin composition using the curing agent. This invention relates to an epoxy resin curing agent having a pot life from 5 min to 15 min and having storage stability.

In Japanese Patent No. 269203/1996, there is disclosed a thiol group-containing polyether polymer obtained by allowing a halogen-terminated polyether polymer which is obtained by addition of epihalohydrin to a polyol having a polyether moiety in the main chain and having 3 or more hydroxyl groups at the ends to react with an alkali hydrosulfide and/or an alkali polysulfide in amides. It is indicated that an epoxy resin composition containing this polyether polymer has favorable curability, but when this epoxy resin composition is used as a curing agent for epoxy resins, the gel time is so short that curing is initiated while the epoxy resin and a thiol compound that is a curing agent are being mixed with each other, and hence, the working conditions are restricted.

An epoxy resin curing composition using a hetero ring-containing compound, which is described in WO99/54373, has low-temperature curability and rapid curability at ordinary temperature, but the workability is poor because its gel time is short.

In Japanese patent No. 21693/1992, there is disclosed a liquid polysulfide polymer for epoxy resin curing, which is a copolymer obtained by allowing a mixture of a tri- or tetrafunctional alkyl halide and a bifunctional alkyl halide to react with an alkali polysulfide, the amount of said polyfunctional monomers in the polymerization being 20 to 60% by mol based on all the monomers, and which contains 2 to 30% by mass of end thiol groups. It is indicated that by using this liquid sulfide polymer in combination with an amine, the curing rate becomes higher as compared with that of conventional polysulfide polymers. However, the gel time is short, and the resulting cured product has a problem of workability because it develops odor, though it is excellent in impact resistance, chemical resistance, etc.

Thus, despite all these prior arts, there is still a need for a two part epoxy adhesive system, whose gel time is controllable and suitable for satisfying different gel time requirements from customers.

The present invention provides a novel epoxy based adhesive system, which allows a controllable gel time ranging from 5 min to more than 24 hours.

SUMMARY OF THE INVENTION

This invention is directed to an epoxy adhesive comprising at least two parts, which includes
a first part A comprising at least one epoxy resin containing two or more epoxy groups in one molecule, and
a second part B comprising at least one thiol curing agent, wherein at least one peroxide containing a —O—O— structure is comprised in part A, part B and/or a third separate part C.

Furthermore this invention is directed to a two part epoxy adhesive, which includes a first part comprising an epoxy resin containing two or more epoxy groups in one molecule, and a peroxide containing a —O—O— structure; and a second part comprising a thiol curing agent and an curing accelerator.

Furthermore this invention is directed to a two part epoxy adhesive, which includes a first part comprising an epoxy resin containing two or more epoxy groups in one molecule, and a curing accelerator; and a second part comprising a thiol curing agent and a peroxide containing a —O—O— structure.

In one embodiment of the inventive adhesive, the peroxide has a formula of R1-O—O—R2, wherein R1 and R2 are each independently selected from hydrogen atom, alkyl group of 1 to 10 carbon atoms and aromatic group including one or more phenyl group, and optionally there is a carbonyl group between R1, R2 and —O—O—.

In a further embodiment of the inventive adhesive system, the thiol curing agent containing one or more —R3-SH groups in one molecule, wherein R3 is an alkylene group which includes 2 to 16 carbon atoms or an aromatic group.

A preferred embodiment of the inventive adhesive comprises:
a first part A comprising 100 parts by weight of an epoxy resin containing two or more epoxy groups in one molecule, and
a second part B comprising 110 to 120 parts by weight of a thiol curing agent, wherein 0.03 to 3 parts by weight of a peroxide containing a —O—O— structure is comprised in part A, part B and/or a third separate part C.

An even more preferred embodiment is directed to an epoxy adhesive comprising a first part comprising 100 parts by weight of an epoxy resin containing two or more epoxy groups in one molecule; 0.03 to 3 parts by weight of a peroxide containing a —O—O— structure; and a second part comprising 110 to 120 parts by weight of a thiol curing agent, 0.05 to 5 parts by weight of an curing accelerator.

An alternative embodiment is directed to an epoxy adhesive comprising a first part comprising 100 parts by weight of an epoxy resin containing two or more epoxy groups in one molecule and 0.05 to 5 parts by weight of an curing accelerator; and a second part comprising 110 to 120 parts by weight of a thiol curing agent and 0.03 to 3 parts by weight of a peroxide containing a —O—O— structure.

A further embodiment is directed to a method for extending the gel time of an epoxy adhesive which is prepared by mixing a first part A comprising an epoxy resin containing two or more epoxy groups in one molecule with a second part B comprising a thiol curing agent, wherein the first part A and/or the second part B comprises a peroxide containing a —O—O— structure.

A further embodiment is directed to a method for extending the gel time of an epoxy adhesive which is prepared by mixing a first part A comprising an epoxy resin containing two or more epoxy groups in one molecule with a second part B comprising a thiol curing agent, wherein a third part C comprising a peroxide containing a —O—O— structure is added.

A further embodiment of the present invention is directed to the use of a peroxide containing a —O—O— structure to extend the gel time of an epoxy adhesive obtained by mixing a first part A comprising an epoxy resin containing two or more epoxy groups in one molecule with a second part B comprising a thiol curing agent.

Advantages and unique features of the inventive adhesive system include:

the gel time of the epoxy based compositions can be easily controlled;

peroxide is for the first time used to delay the reaction of thiol-amine curing system; and this adhesive system is suitable for satisfying different gel time requirements from customers.

Various other features, aspects, and advantages of the present invention will become more apparent with reference to the following description, examples, and appended claims.

DETAILS OF THE INVENTION

All publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this invention belongs. In case of conflict, the present specification, including definitions, will control.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. For example, when a range of "1 to 5" is recited, the recited range should be construed as including ranges "1 to 4", "1 to 3", "1 to 2", "1 to 2 & 4 to 5", "1 to 3 & 5", and the like. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

Further, unless expressly stated to the contrary, "or" refers to an inclusive "or" and not to an exclusive "or". For example, a condition A "or" B is satisfied by any one of the following: A is true (or present) and B is false (or not present), A is false (or not present) and B is true (or present), and both A and B are true (or present).

Also, the indefinite articles "a" and "an" preceding an element or component of the invention are intended to be nonrestrictive regarding the number of instances (i.e. occurrences) of the element or component. Therefore, "a" or "an" should be read to include one or at least one, and the singular word form of the element or component also includes the plural unless the number is obviously meant to be singular.

The materials, methods, and examples herein are illustrative only and, except as specifically stated, are not intended to be limiting. Although methods and materials similar or equivalent to those described herein can be used in the practice or testing of the present invention, suitable methods and materials are described herein.

The invention is described in detail hereinafter.

As used herein, all concentration shall be expressed as percentages by weight unless otherwise specified.

Upon extensive experimentation, the inventors found that desirable effects were achieved using a two part epoxy adhesive comprising:

a first part A comprising 100 parts by weight of an epoxy resin containing two or more epoxy groups in one molecule; 0.03 to 3 parts by weight of a peroxide containing a —O—O— structure;

and a second part B comprising 110 to 120 parts by weight of a thiol curing agent, 0.05 to 5 parts by weight of an curing accelerator.

A preferred embodiment of the inventive adhesive comprises:

a first part A comprising 100 parts by weight of an epoxy resin containing two or more epoxy groups in one molecule; 0.2 to 2 parts by weight of a peroxide containing a —O—O— structure; 6 to 7 parts by weight of silane, and 4 to 5 parts by weight of thixotropic agent;

and a second part B comprising 113 to 118 parts by weight of a thiol curing agent, 0.2 to 5 parts by weight of an accelerator, and 12 to 16 parts by weight of filler.

Upon extensive experimentation, the inventors found that desirable effects were furthermore achieved using a two part epoxy adhesive comprising:

a first part A comprising 100 parts by weight of an epoxy resin containing two or more epoxy groups in one molecule; 0.05 to 5 parts by weight of an curing accelerator;

and a second part B comprising 110 to 120 parts by weight of a thiol curing agent; 0.03 to 3 parts by weight of a peroxide containing a —O—O— structure.

A preferred embodiment of the inventive adhesive comprises:

a first part A comprising 100 parts by weight of an epoxy resin containing two or more epoxy groups in one molecule; 0.2 to 5 parts by weight of an accelerator, 6 to 7 parts by weight of silane, and 4 to 5 parts by weight of thixotropic agent;

and a second part B comprising 113 to 118 parts by weight of a thiol curing agent, 0.2 to 2 parts by weight of a peroxide containing a —O—O— structure; and 12 to 16 parts by weight of filler.

In this invention, the epoxy resin containing two or more epoxy group in molecule, examples of the epoxy resins include polyhydric phenols, such as bisphenol A, halogenated bisphenol A, bisphenol F, halogenated bisphenol F, resorcinol, hydroquinone, pyrocatechol, 4,4'-dihydroxybiphenyl and 1,5-hydroxynaphthalene, polyhydric alcohols, such as ethylene glycol, propylene glycol and glycerol, and epoxy resins obtained by the addition of epichlorohydrin to aromatic dicarboxylic acids such as oxybenzoic acid and phthalic acid, but the epoxy resins are not limited to these resins. Examples of commercially available epoxy resin products include Epon® 828, 826, 862, 1001, 1002, 1071 (from Hexion Co. Ltd), DER® 331, 332, 354, 671, 431, 731 (from Dow Chemical Co. Ltd), Epicoat® 828, 1001, 801, 806, 807, 152, 604, 630, 871, YX8000, YX8034, YX4000 and Cardura® E10P (from Japan Epoxy Resins Co., Ltd.), Epichlon® 830, 835LV, HP4032D, 703, 720 and HP820 (from Dainippon Ink & Chemicals, Inc.), EP4100, EP4000, EP4080, EP4085, EP4088, EPU6, EPR4023, EPR1309 and EP49-20 (from ADEKA Corporation), Denachol EX411, EX314, EX201, EX212, EX252, EX111, EX146 and EX721 (from Nagase ChemteX Corporation), KBM403 and KBE402 (from Shin-Etsu Chemical Co., Ltd.) and multi-functional epoxy resins MY721 (from Huntsman), AG 80 (from SOT) and JEH 010 (from Changsu Jiafa), but the epoxy resin products are not limited to these products. These resins can be used singly or can be used in combination of two or more kinds in arbitrary proportions. In one embodiment of the present invention the epoxide resins containing two or more epoxy groups used shall be substantially free of any polymerizable C=C double bond. Substantially free of any polymerizable C=C double bond shall mean within this invention that the epoxy resins contain less than 20 mol-%, preferably less than 5 mol-%, more preferably less than 0.5 mol-% of polymerizable C=C double bonds in relation to the total amount of epoxy group in the inventive epoxy adhesive. In one other embodiment it can be preferred that the epoxy resins are generally free of any C=C double bonds which are part of a (meth)acrylate moiety.

The peroxide used in the invention has such structure as R1—O—O—R2, in which R1 and R2 are each independently selected from hydrogen atom, alkyl group of 1 to 10 carbon atoms and aromatic group including one or more phenyl group, and optionally there is a carbonyl group between R1, R2 and —O—O—. Examples of commercially available products include Benzoyl peroxide (CAS No. 94-36-0), TRIGONOX® C-50D, TRIGONOX® P-50S, PERKADOX® L-50S, PERKADOX® PD-50S (from Akzo Nobel Chemical Co. Ltd), tert-amylperoxy-3,5,5-trimethylhexanoate, tert-butylperoxyacetate, 1,1-di-(tert-butylperoxy)cyclohexane, 1,1,-di-(tertbutylperoxy)-3,3,5-trimethylcyclohexane, methyl ethyl ketone peroxides, 2,5-dimethyl-2,5-di-(tert-butylperoxy)hexyne-3, tert-butyl-monoperoxymaleate, 3-chloroperoxybenzoic acid, dibenzoyl peroxide, di-4-chlorobenzoyl peroxide, 2,2-dihydroperoxypropane, 2,5-dimethyl-2,5-di-(benzoylperoxy)hexane, di-(2-phenoxyethyl) peroxydicarbonate, disuccinic acid peroxide, 3,3,6,6,9,9-hexamethyl-1,2,4,5-tetraoxacyclononane, 2,5-dimethyl-2,5-di-(benzoylperoxy)hexane, di-(2-phenoxyethyl) peroxydicarbonate, disuccinic acid peroxide, tert-amyl peroxybenzoate, n-butyl-4,4-di-(tert-butylperoxy)valerate, tert-butyl hydroperoxide, di-tert-butylperoxide, tert-butyl-monoperoxymaleate, tert-butyl peroxyacetate, tert-butyl peroxybenzoate, tert-butylperoxy isopropylcarbonate, tert-butylperoxy-2-methylbenzoate, 1,1-di-(tert-amylperoxy) cyclohexane, 2,2-di-(tert-butylperoxy)butane, 1,1-di-(tert-butylperoxy)-3,3,5-trimethylcyclohexane, 2,5-dimethyl-2,5-di-(tert-butylperoxy)hexyne-3-ethyl, 3,3-di-(tert-butylperoxy)butyrate, cyclohexanone peroxide, 2,5-dimethyl-2,5-di(benzoylperoxy)hexane, 2,5-dimethyl-2,5-dihydroperoxyhexane acetyl acetone peroxide, acetyl benzoyl peroxide (from Aldrich chemical company). Suitable peroxides are not limited to these compounds. Preferably, in the peroxide R1-O—O—R2, there is a carbonyl group between R1, R2 and —O—O—. The peroxide was used as solution when preparing the inventive adhesives, and the used solvent includes ethyl acetate, acetone, chloroform and the like.

The reason for using silane in this invention is to increase the crosslink degree for cured compound and used as a coupling agents between fillers and resin substrates.

Optionally, one or more silanes can be used in this invention, and these silane can be ended by amine, alkyl, or epoxy groups. Commercially products include KH550, KH560 (from Chinese Chemical Company), Glymo®, Wetlink® 78 (from Evonik), A-1106, A-1702, A-1002 (from Momentive Co. Ltd). The silane products are not limited to these products. These resins can be used singly or can be used in combination of two or more kinds in arbitrary proportions. In one embodiment the one or more silanes are contained in the first part A of the inventive epoxide adhesive.

Optionally, one or more thixotropic agents can be used in this invention to control the thixotropic and viscosity properties of the adhesive, commonly used is fumed silica, the commercially products that can be used in invention include Cabosil® TS-720, Cabosil® M5 (from Cabot Company). In one embodiment the one or more thixotropic agents are contained in the first part A of the inventive epoxide adhesive.

Optionally, one or more curing accelerators can be used in this invention. The curing accelerator can be a nucleophilic substance such as an amine, a tertiary phosphine, a quaternary ammonium salt with a nucleophilic anion, a quaternary phosphonium salt with a nucleophilic anion, an imidazole, a tertiary arsenium salt with a nucleophilic anion and a tertiary sulfonium salt with a nucleophilic anion. Possible amine catalysts include primary, secondary and tertiary amines. Various mixtures of catalysts can be used. Tertiary amine accelerator are preferred and are described, for examples: trimethylamine, triethylamine, tetraethylmethylenediamine, tetramethylpropane-1,3-diamine, tetramethylhexane-1,6-diamine, pentamethyldiethylenetriamine, pentamethyldipropylenetriamine, bis(2-dimethylaminoethyl)ether, ethylene glycol (3-dimethyl)aminopropyl ether, dimethylaminoethanol, dimethylaminoethoxyethanol, N,N,N'-trimethylaminoethylethanolamine, dimethylcyclohexylamine, N,N-dimethylaminomethylphenol, N,N-dimethylpropylamine, N,N,N',N'-tetramethylhexamethylenediamine, N-methylpiperidine, N,N'-dimethylpiperazine, N,N-dimethylbenzylamine, dimethylaminomethylphenol, 2,4,6-tris(dimethylaminomethyl)phenol, 1,8-diazabicycloundecene-7,1,5-diazabicyclo-nonene-5,6-dibutylamino-1,8-diazabicycloundecene-7,1,2-dimethylimidazole, dimethylpiperazine, N-methyl-N'-(2-dimethylamino)-ethylpiperazine, N-methylmorpholine, N—(N',N'-(dimethylamino)ethyl)morpholine, N-methyl-N'-(2-hydroxyethyl) morpholine, triethylenediamine and hexamethylenetetramine. Of these, tertiary amines are preferable, and N,N-dimethylbenzylamine and 2,4,6-tris(dimethylaminomethyl)phenol are particularly preferable. These can be used singly or can be used in combination of two or more kinds in arbitrary proportions. In one embodiment of the present invention the one or more curing accelerators are comprised in a part of the epoxide adhesive which does not contain any peroxide component.

The thiol curing agent used in this invention contains one or more —R3-SH groups in molecules, R3 is an alkylene group including 2 to 16 carbon atoms or an aromatic group. Examples for the commercially products include Polythiol QE 340M, GMP 800 (CAS No. 100-53-8), Didodecanethiol (CAS No. 112-55-0), 1,3-dimercaptopropane (CAS No. 109-80-8), 1,4-butanediolbis(thioglycollate) (CAS No. 10193-95-0), 1,6-Hexanediolbis(thioglycolate) (CAS No. 15430-

31-6), Trimethylolpropanetris(thioglycolate) (CAS No. 10193-96-1), Pentaerythritoltetrakis(thioglycolate) (CAS No. 10193-99-4), Ethyleneglycolbis(3-mercaptopropionate) (CAS No. 22504-50-3), 1,4-Butanediylbis(3-mercaptopropionate) (CAS No. 92140-97-1), Trimethylolpropanetris(3-mercaptopropionate) (CAS No. 33007-83-9), Pentaerythritoltetrakis(3-mercaptopropionate) (CAS No. 7575-23-7), Stearylmercaptan (CAS No. 2885-00-9) and Capcure® 3-800 (Cognis Chemical company).

Optionally, one or more fillers can be used in the invention, and it is not specifically restricted. Examples for commonly used fillers include $CaCO_3$, $SiO_2$, $BaSO_4$, $Al_2O_3$, $CaSiO_4$. In one embodiment the one or more fillers are contained in the second part B of the inventive epoxide adhesive.

Optionally, one or more tougheners can be used in this invention, and it is not specifically restricted. Such tougheners are known to the person skilled in the art in the field of epoxy adhesives. They can be selected for example from: thermoplastic isocyanates or polyurethanes, rubber particles, in particular those having a core-shell structure, and block copolymers, in particular those containing a first polymer block having a glass transition temperature of less than 15° C. and a second polymer block having a glass transition temperature of greater than 25° C. Such block copolymers are preferably selected from those in which a first polymer block is selected from a polybutadiene or polyisoprene block and a second polymer block is selected from a polystyrene or a polymethyl methacrylate block. Specific examples thereof are block copolymers having the following block structure: styrene-butadiene-(meth)acrylate, styrene-butadiene-(meth)acrylic acid ester, ethylene-(meth)acrylic acid ester-glycidyl (meth)acrylic acid ester, ethylene-(meth)acrylic acid ester-maleic anhydride, methyl methacrylate-butyl acrylate-methyl methacrylate.

Tougheners that are preferred according to the invention are furthermore rubber particles having a core-shell structure with a core made from a polymer material having a glass transition temperature of less than 0° C. and a shell made from a polymer material having a glass transition temperature of greater than 25° C. Particularly suitable rubber particles having a core-shell structure can have a core made from a diene homopolymer, a diene copolymer or a polysiloxane elastomer and/or a shell made from an alkyl(meth)acrylate homopolymer or copolymer.

For example, the core of these core-shell particles can contain a diene homopolymer or copolymer, which can be selected from a homopolymer of butadiene or isoprene, a copolymer of butadiene or isoprene with one or more ethylenically unsaturated monomers, such as for example vinyl aromatic monomers, (meth)acrylonitrile, (meth)acrylates or similar monomers. The polymer or copolymer of the shell can contain as monomers for example: (meth)acrylates, such as in particular methyl methacrylate, vinyl aromatic monomers (for example styrene), vinyl cyanides (for example acrylonitrile), unsaturated acids or anhydrides (for example acrylic acid), (meth)acrylamides and similar monomers, which lead to polymers having a suitable high glass transition temperature.

The polymer or copolymer of the shell can contain acid groups, which can crosslink by metal carboxylate formation, for example by salt formation with divalent metal cations. The polymer or copolymer of the shell can furthermore be covalently crosslinked by using monomers having two or more double bonds per molecule.

Other rubber-like polymers can be used as the core, such as for example polybutyl acrylate or polysiloxane elastomers, such as for example polydimethyl siloxane, in particular crosslinked polydimethyl siloxane.

These core-shell particles are typically constructed in such a way that the core makes up 50 to 95 wt. % of the core-shell particle and the shell makes up 5 to 50 wt. % of this particle.

These rubber particles are preferably relatively small. For example, the average particle size (determinable by light scattering methods for example) can be in the range from approximately 0.03 to approximately 2 µm, in particular in the range from approximately 0.05 to approximately 1 µm. Smaller core-shell particles can however likewise be used, for example those whose average diameter is less than approximately 500 nm, in particular less than approximately 200 nm. The average particle size can for example lie in the range from approximately 25 to approximately 200 nm.

The production of such core-shell particles is known in the prior art, as is indicated for example in WO 2007/025007 on page 6, lines 16 to 21. Commercial supply sources for such core-shell particles are listed in this document in the last paragraph of page 6 to the first paragraph of page 7. Reference is hereby made to these supply sources. Reference is moreover made to production methods for such particles, which are described in the cited document from page 7, second paragraph to page 8, first paragraph. For more information on suitable core-shell particles reference is likewise made to the cited document WO 2007/025007, which contains detailed information on this subject from page 8, line 15 to page 13, line 15.

Inorganic particles having a shell made from organic polymers can take on the same function as the aforementioned rubber particles having a core-shell structure.

In this embodiment the material according to the invention preferably contains inorganic particles having a shell made from organic polymers, the organic polymers being selected from homopolymers or copolymers of acrylic acid and/or methacrylic acid esters and containing at least 30 wt. % of acrylic acid and/or methacrylic acid esters incorporated by polymerization.

The acrylic acid and/or methacrylic acid esters are preferably methyl and/or ethyl esters, wherein at least a proportion of the esters is particularly preferably present as methyl ester. The polymers can additionally also contain unesterified acrylic and/or methacrylic acid, which can improve the binding of the organic polymers to the surface of the inorganic particles. In this case it is therefore particularly preferable for the monomer units of unesterified acrylic and/or methacrylic acid to be located at (or near to) the end of the polymer chain that binds to the surface of the inorganic particles.

It is preferable here for the organic polymers to be made up of at least 80 wt. % acrylic acid and/or methacrylic acid esters. In particular they can be made up of 90 wt. %, 95 wt. % or entirely thereof. If the organic polymers contain monomers other than said acrylic acid and/or methacrylic acid esters or unesterified acrylic acid and/or methacrylic acid, they are preferably selected from comonomers having epoxy, hydroxyl and/or carboxyl groups.

The organic polymers of the shell are preferably uncrosslinked or so weakly crosslinked that no more than 5% of monomer units of one chain are crosslinked with monomer units of another chain. It can be advantageous here for the polymers in the vicinity of the surface of the inorganic particles to be more strongly crosslinked than those further outside in the shell. In particular the shell is preferably constructed in such a way that at least 80%, in particular at least 90% and particularly preferably at least 95% of the polymer chains are bound by one end to the surface of the inorganic particles.

Before the shell of organic polymers is applied, the inorganic particles preferably have an average particle size in the range from 1 to 1000, in particular in the range from 5 to 30 mm. It is known that the particle size can be determined by light scattering methods and by electron microscopy.

The shell of organic polymers has a lower density than the inorganic particles themselves. The shell of organic polymers preferably has a thickness such that the weight ratio of the inorganic core to the shell of organic polymers is in the range from 2:1 to 1:5, preferably in the range from 3:2 to 1:3. This can be controlled by the choice of reaction conditions when growing the shell of organic polymers onto the inorganic particles.

In general the inorganic particles can be selected from metals, oxides, hydroxides, carbonates, sulfates and phosphates. Mixed forms of oxides, hydroxides and carbonates, such as for example basic carbonates or basic oxides, can also be present. If inorganic particles of metals are chosen, iron, cobalt, nickel or alloys comprising at least 50 wt. % of one of these metals are preferably suitable. Oxides, hydroxides or mixed forms thereof are preferably selected from those of silicon, cerium, cobalt, chromium, nickel, zinc, titanium, iron, yttrium, zirconium and/or aluminum Mixed forms of these too are possible, such as for example particles of alumosilicates or of siliceous glasses. Zinc oxide, aluminum oxides or hydroxides and $SiO_2$ and the oxide forms of silicon referred to as silica are particularly preferred. The inorganic particles can moreover consist of carbonates, such as for example calcium carbonate, or of sulfates, such as for example barium sulfate.

It is naturally also possible for particles having differently constituted inorganic cores to be present side by side.

The method described in WO 2004/111136 A1 by reference to the example of coating zinc oxide with alkylene ether carboxylic acids can be used for example to produce the inorganic particles having a shell of organic polymers. According to this processing mode the untreated inorganic particles are suspended in a non-polar or scarcely polar solvent, then monomeric or prepolymeric constituents of the shell are added, the solvent is removed, and polymerization is started, radically or photochemically for example. Furthermore, it is possible to proceed in an analogous manner to the production method described in EP 1 469 020 A1, wherein monomers or prepolymers of the shell material are used as the organic coating component for the particles. Furthermore, a production of the encapsulated particles by atom transfer radical polymerization is possible, as described by way of example in relation to the polymerization of n-butyl acrylate onto silica nanoparticles in: G. Carrot, S. Diamanti, M. Manuszak, B. Charleux, J.-P. Vairon: "Atom Transfer Radical Polymerization of n-Butyl Acrylate from Silica Nanoparticles", J. Polym. Sci., Part A: Polymer Chemistry, Vol. 39, 4294-4301 (2001).

Furthermore, production methods as described in WO 2006/053640 can be used. For the present invention inorganic cores should be selected such as are described in WO 2006/053640 from page 5, line 24 to page 7, line 15 along with their production methods. The coating of these cores takes place in an analogous manner to the description given in this document from p. 10, line 22 to p. 15, line 7. The proposal in this document for pretreating the inorganic cores prior to application of the shell by polymerization can also be followed (page 15, lines 9 to 24). It states here in this regard:

"In particular where inorganic cores are used, it may also be preferable for the core to be subjected to pretreatment which enables binding of the shell before the shell is applied by polymerization. This can conventionally consist in a chemical functionalization of the particle surface, as is known from the literature for a very wide variety of inorganic materials. It may preferably involve in particular the application to the surface of such chemical functions which as a reactive chain end allow grafting of the shell polymers. Terminal double bonds, epoxy functions and polycondensable groups can be cited here in particular as examples. The functionalization of hydroxyl group-bearing surfaces with polymers is known for example from EP-A-337 144."

In one embodiment of the present invention it can be preferred to include a toughener which is substantially free of C=C double bonds in the inventive epoxy adhesive. Substantially free of C=C double bond shall mean within this invention that the toughener contains less than 5 mol-% of C=C double bonds in relation to the total amount of epoxy groups in the inventive epoxy adhesive. Additionally it can be preferred that the toughener is generally free of any C=C double bond which is part of a 1,2-polybutadiene moiety, a 1,4-polybutadiene moiety or a polyisoprene moiety.

The process for preparing the epoxy resin composition of the invention is not specifically restricted as long as the materials used can be mixed and dispersed, and for example, the following processes can be used.

(1) The components are mixed by a stirring rod, a spatula or the like in an appropriate container, such as a glass beaker, a can, a plastic cup or an aluminum cup.

(2) The components are mixed by a double helical ribbon impeller, a gate impeller or (3) The components are mixed by a planetary mixer.

(4) The components are mixed by a bead mill.

(5) The components are mixed by a three-roll mill.

(6) The components are mixed by an extruder type kneading extrusion machine.

These preparation process can be used but the preparation process is not limited these process. These preparation processes can be used singly or can be used in combination of two or more process in preparing two components separately.

Tests

Gel Time Measurement

The gel time measurements were based on the standard ASTM D3532-99. The gel time is considered as the time when the viscosity of the adhesive increased to twice time of the original compound.

Lap Shear Strength Measurement

The lap shear strength measurements were based on the testing standard ASTM D 3161. The substrates used are cold rolled steel, and the bonding line is 10 mm*25 mm. The surface of the substrates were washed by ethylacetate or actone. The data show in table 1 is the average value for at least 5 measurement data.

EXAMPLES

To illustrate the advantages of the inventive adhesives, different two-part epoxy adhesives were prepared and tested in gel time measurements and lap shear strength measurements.

In the examples provided below, the following materials were used.

| Trade names | Compound names or formulae | Suppliers |
| --- | --- | --- |
| Epon ®828 | Bis phenol A Epoxy resin | Hexion |
| Epon ®862 | Bis phenol F Epoxy resin | Hexion |

-continued

| Trade names | Compound names or formulae | Suppliers |
|---|---|---|
| DER ®331 | Bis phenol A Epoxy resin | DOW |
| DER ®671 | Solid Bis phenol A Epoxy resin | DOW |
| YX8000 | Hydrogenated Epoxy resin | JER |
| MY721 | Multi-functional epoxy resin | Huntsman |
| AG80 | Multi-functional epoxy resin | SOI |
| Perkadox ® L-50S | Dibenzoyl peroxide, paste 50% in silicone oil | Akzo Nobel |
| Trigonox ® P-50S | Acetyl benzoyl peroxide | Akzo Nobel |
| A1106 | 3-aminopropyltriethoxylsilane aqueous solution | Momentive |
| Wetlink ® 78 | Epoxy functional silane | Evonik |
| Glymo ® | Epoxy functional silane | Evonik |
| M5 | Fumed silica | Cabot |
| TS ®-720 | Fumed silica | Cabot |
| Polythiol QE340M | Polythiol | Akzo Nobel |
| Capcure ® 3-800 | Difunctional thiol polymer | Akzo Nobel |
| GMP 800 | Difunctional thiol polymer | Momentive |
| DMP-30 | 2,4,6-tris(dimethylaminomethyl)phenol | Aldrich |

Example 1 to 14

Useful Embodiment for the Invention Including the Key Performance Principles

The ingredients listed in Table 1 were combined to provide gel-time controllable epoxy based adhesives. By keeping the amounts of the other components in the formulations constant and only varying the concentration of the peroxide, the gel time can be adjusted from 5 min to more than 24 h. The procedure for preparation of the first part as follows: peroxide was dissolved into acetone to form a solution with peroxide concentration 0.12 g/ml. Epoxy resin was weighed out in a speedmixer cup at room temperature and then peroxide solution was weighed out in the mixing container, mixing the two components under 2000 rpm THINKY® Speedmixer for 1 min at room temperature. The silane and thixotropic agent were weighed out in the mixing container. The combined four components were mixed with 2000 rpm rate for 1 minute under room temperature and 0.2 kPa vacuum in THINKY® Speedmixer. After mixing and taking out from speedmixer, the liquid mixture was dropped in to a one part of 2K cartridge. The procedure for preparation of the second part as follows: firstly, thiol used as curing agent was weighed out in a mixing container and then amine catalyst was weighed out in mixing container, mixing the two components under 2000 rpm THINKY® Speedmixer for 30 seconds at room temperature, and then fillers were weighed and added into the mixture. The combined three components were mixed with 2000 rpm rate for 1 minute under room temperature and 0.2 kPa vacuum in THINKY® Speedmixer. After mixing and taking out from speedmixer, the liquid mixture was dropped in to another one part of 2K cartridge. Samples for gel time measurements or mechanical properties measurements were prepared by using a mechanical or air pressure adhesive gun to extrude the two parts out and mixing, then apply it onto substrates.

The gel time measurements were based on the standard ASTM D3532-99, and the results were listed in Table 1. From it we can find that the gel time will increase from 4.2 min to 24 hours by increasing the benzoyl peroxide from 0.03 to 2.99 weight % in formulations. The lap shear strength measurements were based on the testing standard ASTM D 3161, The used substrates are cold rolled steel. The measurement results were shown in Table 1. From it we can find that the addition of peroxide in the formulation will not have negative influence on the mechanical performance of the adhesives

TABLE 1*

| Components | Trade names | Suppliers | Ex. 1 | Ex. 2 | Ex. 3 | Ex. 4 | Ex. 5 | Ex. 6 | Ex. 7 |
|---|---|---|---|---|---|---|---|---|---|
| Epoxy resin | Epon ®828 | Hexion | 100 | 100 | 100 | 100 | 100 | 100 | 100 |
| Peroxide | Benzoyl peroxide | Aldrich | 0.03 | 0.3 | | | 1.35 | 1.58 | 1.90 |
| Silane | A1106 | Momentive | 5.2 | 5.2 | 5.2 | 5.2 | 5.2 | 5.2 | 5.2 |
| Thixotropic agent | TS-720 | Cabot | 4 | 4 | 4 | 4 | 4 | 4 | 4 |
| Thiol curing agent | Capcure ® 3-800 | Cognis | 112 | 112 | 112 | 112 | 112 | 112 | 112 |
| Curing accelerator | Dimethyl benzoyl amine (DMBA) | Aldrich | | 4.36 | 4.41 | 4.48 | 4.53 | 4.57 | 4.62 |
| Fillers | CaCO$_3$ | Ankerpoort | 8 | 8 | 8 | 8 | 8 | 8 | 8 |
| Gel time | | | 4.2 min | 6.6 min | 11.7 min | 28.8 min | 36.3 min | 47.6 min | 1.1 h |
| Lap shear strength on CRS substrates | | | 14.9 MPa | 14.8 MPa | 15.2 MPa | 14.9 MPa | 15.1 MPa | 14.6 MPa | 14.2 MPa |

| Components | Trade names | Suppliers | Ex. 9 | Ex. 10 | Ex. 11 | Ex. 12 | Ex. 13 | Ex. 14 |
|---|---|---|---|---|---|---|---|---|
| Epoxy resin | Epon ®828 | Hexion | 100 | 100 | 100 | 100 | 100 | 100 |
| Peroxide | Benzoyl peroxide | Aldrich | 2.34 | 2.68 | 1.82 | 2.14 | 2.48 | 2.99 | 2.79 |
| Silane | A1106 | Momentive | 5.2 | 5.2 | 5.2 | 5.2 | 5.2 | 5.2 | 5.2 |
| Thixotropic agent | TS-720 | Cabot | 4 | 4 | 4 | 4 | 4 | 4 | 4 |
| Thiol curing agent | Capcure ® 3-800 | Cognis | 112 | 112 | 112 | 112 | 112 | 112 | 112 |
| Curing accelerator | Dimethyl benzoyl amine (DMBA) | Aldrich | 4.68 | 4.73 | 2.28 | 2.3 | 2.33 | 2.36 | 0.23 |
| Fillers | CaCO$_3$ | Ankerpoort | 8 | | 8 | 8 | 8 | 8 | 8 |
| Gel time | | | 1.7 h | 2.2 h | 3.3 h | 4.6 h | 6.3 h | 9 h | 24 h |
| Lap shear strength on CRS substrates | | | 14.7 MPa | 14.5 MPa | 15.2 MPa | 14.8 MPa | 14.2 MPa | 15.0 MPa | 14.2 MPa |

*unit for ingredients is grams.

Examples 15 to 35

The weights of components were listed in Table 2, and the procedure processes for examples 15 to 35 are similar as examples 1 to 14. The used peroxides including Perkadox® L-50S, Trigonox® P-50S were dissolved in acetone with a concentration of 0.12 g/ml. In the first part, epoxy resin was weighed out in a speedmixer cup at room temperature and then peroxide solution was weighed out in the mixing container, mixing the two components under 2000 rpm THINKY® Speedmixer for 1 min at room temperature. The silane and thixotropic agent were weighed out in the mixing container. The combined four components were mixed with 2000 rpm rate for 1 minute under room temperature and 0.2 kPa vacuum in THINKY® Speedmixer. After mixing and taking out from speedmixer, the liquid mixture was dropped in to a one part of 2K cartridge. The procedure for preparation of the second part as follows: firstly, thiol used as curing agent was weighed out in a mixing container and then amine catalyst was weighed out in a mixing container, mixing the two components under 2000 rpm THINKY® Speedmixer for 30 seconds at room temperature. The fillers were weighed and added into the mixture, then the combined three components were mixed with 2000 rpm rate for 1 minute under room temperature and 0.2 kPa vacuum in THINKY® Speedmixer. After mixing and taking out from speedmixer, the liquid mixture was dropped in to another one part of 2K cartridge.

TABLE 2

Part A*

| Components | Trade names | Suppliers | Ex. 15 | Ex. 16 | Ex. 17 | Ex. 18 | Ex. 19 | Ex. 20 | Ex. 21 |
|---|---|---|---|---|---|---|---|---|---|
| Epoxy resin | Epon ®828 | Hexion | — | — | — | 100 | — | — | — |
|  | Epon ®862 | Hexion | 100 | — | 100 | — | — | — | — |
|  | DER ®331 | DOW | — | 100 | — | — | — | 100 | 100 |
|  | DER ®671 | DOW | — | — | — | — | 100 | — | — |
|  | YX ®8000 | JER | — | — | — | — | — | — | — |
| Peroxide | Benzoyl peroxide | Aldrich | — | — | 0.89 | — | 1.53 | — | 1.67 |
|  | Perkadox ® L-50S | Akzo Nobel | 0.73 | 1.04 | — | — | — | 0.89 | — |
|  | Trigonox ® P-50S | Akzo Nobel | — | — | — | 1.13 | — | — | — |
| Silane | A1106 | Momentive | 5 | 5 | 5 | 5 | — | — | — |
|  | Wetlink ® 78 | Evonik | — | — | — | — | 5 | 6 | 7 |
|  | Glymo ® | Evonik | — | — | — | — | — | — | — |
| Thixotropic agent | Cabosil ®M5 | Cabot | 3 | 3 | 3 | 3 | 3 | — | — |
|  | Cabosil ® TS ®-720 | Cabot | — | — | — | — | — | 5 | 5 |

| Components | Trade names | Suppliers | Ex. 22 | Ex. 23 | Ex. 24 | Ex. 25 | Ex. 26 | Ex. 27 | Ex. 28 |
|---|---|---|---|---|---|---|---|---|---|
| Epoxy resin | Epon ®828 | Hexion | — | 50 | 20 | 100 | — | — | — |
|  | Epon ®862 | Hexion | 100 | — | 80 | — | 100 | 100 | — |
|  | DER ®331 | DOW | — | 50 | — | — | — | — | — |
|  | DER ®671 | DOW | — | — | — | — | — | — | — |
|  | YX ®8000 | JER | — | — | — | — | — | — | 100 |
| Peroxide | Benzoyl peroxide | Aldrich | 0.87 | 0.74 | — | 2.25 | — | — | 3 |
|  | Perkadox ® L-50S | Akzo Nobel | — | — | 0.74 | — | 2.78 | 0.21 | — |
|  | Trigonox ® P-50S | Akzo Nobel | — | — | — | — | — | — | — |
| Silane | A1106 | Momentive | — | — | — | 5 | 1 | — | — |
|  | Wetlink ® 78 | Evonik | 8 | — | — | 2 | 5 | 2 | — |
|  | Glymo ® | Evonik | — | 6 | 6 | — | — | 3 | 5 |
| Thixotropic agent | Cabosil ®M5 | Cabot | — | 6 | 6 | — | 4 | — | 5 |
|  | Cabosil ® TS ®-720 | Cabot | 5 | — | — | 4 | — | 5 | — |

| Components | Trade names | Suppliers | Ex. 29 | Ex. 30 | Ex. 31 | Ex. 32 | Ex. 33 | Ex. 34 | Ex. 35 |
|---|---|---|---|---|---|---|---|---|---|
| Epoxy resin | Epon ® 828 | Hexion | 100 | 100 | 100 | 100 | — | — | — |
|  | DER ® 331 | DOW | — | — | — | — | 100 | 100 | 100 |
| Peroxide | Benzoyl peroxide | Aldrich | — | — | 0.03 | — | — | 3 | 2.5 |
|  | Trigonox ® P-50S | Akzo Nobel | — | — | — | 2 | — | — | — |
| Silane | A ® 1106 | Momentive | 5 | — | — | 5 | 5 | 5 | — |
|  | Wetlink ® 78 | Evonik | — | 5 | 5 | — | — | — | 5 |
| Thixotropic agent | Cabosil ® M5 | Cabot | 3 | — | 3 | 3 | 3 | 3 | 3 |
|  | Cabosil ® TS-720 | Cabot | — | 3 | — | — | — | — | — |

Part B*

| Components | Trade names | Suppliers | Ex. 15 | Ex. 16 | Ex. 17 | Ex. 18 | Ex. 19 | Ex. 20 | Ex. 21 |
|---|---|---|---|---|---|---|---|---|---|
| Thiol curing agent | Polythiol ® QE340M | Toray | 115 | — | — | 0 | — | — | — |
|  | Capcure ® | Cognis | — | 115 | 100 | 100 | 115 | — | 113 |

TABLE 2-continued

| | | | Ex. 15 | Ex. 16 | Ex. 17 | Ex. 18 | Ex. 19 | Ex. 20 | Ex. 21 |
|---|---|---|---|---|---|---|---|---|---|
| | Capcure® 3-800 | | | | | | | | |
| | GMP® 800 | Lunqi | — | — | 20 | — | — | 115 | — |
| | 1,3-dimer captopropane | Aldrich | — | — | — | 20 | — | — | — |
| Tertiary amine | DMP®-30 | Aldrich | 2.5 | 2.5 | — | — | — | — | 5 |
| | Dimethyl benzoyl amine (DMBA) | Aldrich | — | — | 1.2 | 0.5 | 0.3 | 4.8 | — |
| Fillers | CaCO₃ | Ankerpoort | 15 | — | 15 | — | — | 10 | 15 |
| | SiO₂ | Ankerpoort | — | 15 | — | 15 | 20 | — | — |
| | Gel time | | 37.2 min | 1.0 h | 1.5 h | 3.1 h | 6 h | 16.6 min | 43.7 min |

| Components | Trade names | Suppliers | Ex. 22 | Ex. 23 | Ex. 24 | Ex. 25 | Ex. 26 | Ex. 27 | Ex. 28 |
|---|---|---|---|---|---|---|---|---|---|
| Thiol curing agent | Polythiol® QE340M | Toray | — | — | — | — | — | — | — |
| | Capcure® 3-800 | Cognis | — | 112 | 90 | — | 115 | 112 | 114 |
| | GMP® 800 | Lunqi | — | — | 20 | 110 | — | — | — |
| | 1,3-dimer captopropane | Aldrich | 120 | — | — | — | — | — | — |
| Tertiary amine | DMP®-30 | Aldrich | — | — | 2.4 | — | — | 3.5 | 3.2 |
| | Dimethyl benzoyl amine (DMBA) | Aldrich | 1.6 | 1.8 | — | 2.9 | 4.1 | — | — |
| Fillers | CaCO₃ | Ankerpoort | — | — | — | 15 | — | 10 | 15 |
| | SiO₂ | Ankerpoort | 15 | 15 | 15 | — | 20 | 10 | — |
| | Gel time | | 1.2 h | 52.2 min | 39.6 min | 3.8 h | 3.2 h | 9.4 min | 6.1 h |

| Components | Trade names | Suppliers | Ex. 29 | Ex. 30 | Ex. 31 | Ex. 32 | Ex. 33 | Ex. 34 | Ex. 35 |
|---|---|---|---|---|---|---|---|---|---|
| Thiol curing agent | Capcure 3-800 | Cognis | 110 | 115 | 100 | 110 | — | — | 115 |
| | GMP 800 | Lunqi | — | — | 20 | — | 110 | 110 | — |
| Tertiary amine | Dimethyl benzoyl amine (DMBA) | Aldrich | 2.2 | — | — | 2.13 | 0.05 | 4.9 | 5 |
| Fillers | CaCO₃ | Ankerpoort | 15 | — | 15 | — | — | — | — |
| | SiO₂ | Ankerpoort | — | 15 | — | 15 | — | 18 | 20 |
| | Gel time | | 11.2 min | 72 h | 120 h | 4.5 h | 4 h | 3.3 h | 1.2 h |

*unit for ingredients is grams.

Examples 36 to 38

The weights of components were listed in Table 3, the procedure processes for examples 36 to 38 are similar as examples 1 to 14, the difference is putting peroxide into the second part and amine catalyst (curing accelerator) into the first part. In the first part, epoxy resin was weighed out in a speedmixer cup at room temperature and then amine catalyst was weighed out in the mixing container, mixing the two components under 2000 rpm THINKY® Speedmixer for 1 min at room temperature. The silane and thixotropic agent were weighed out in the mixing container. The combined four components were mixed with 2000 rpm rate for 1 minute under room temperature and 0.2 kPa vacuum in THINKY® Speedmixer. After mixing and taking out from speedmixer, the liquid mixture was dropped in to a one part of 2K cartridge. The procedure for preparation of the second part as follows: firstly, the used peroxides including Perkadox® L-50S, Trigonox® P-50S were dissolved in acetone with a concentration of 0.12 g/ml. Then the thiol compound used as curing agent was weighed out in a mixing container and the peroxide solution was weighed out in a mixing container, mixing the two components under 2000 rpm THINKY® Speedmixer for 30 seconds at room temperature. The fillers were weighed and added into the mixture, then the combined three components were mixed with 2000 rpm rate for 1 minute under room temperature and 0.2 kPa vacuum in THINKY® Speedmixer. After mixing and taking out from speedmixer, the liquid mixture was dropped in to another one part of 2K cartridge.

TABLE 3*

| Components | Trade names | Suppliers | Ex. 36 | Ex. 37 | Ex. 38 |
|---|---|---|---|---|---|
| Epoxy resin | MY721 | Huntsman | 100 | — | 100 |
| | AG 80 | SOI | — | 100 | — |
| Curing accelerator | DMP-30 | Aldrich | 2.1 | — | — |
| | DMBA | Aldrich | — | 2.1 | — |
| Silane | Glymo® | Evonik | 5 | 5 | — |
| | A1106 | Momentive | — | — | 5 |
| Thixotropic agent | Cabosil® TS-720 | Cabot | 3 | 3 | — |
| | Cabosil® M5 | Cabot | — | — | 3 |
| Thiol curing agent | GMP 800 | Momentive | 100 | 100 | 100 |
| Peroxide | BPO | Aldrich | 2 | 2.2 | 2 |
| Fillers | CaCO₃ | Ankerpoort | 20 | 20 | 20 |
| Gel time | | | 30 min | 45 min | 30 min |
| Lap shear strength on CRS substrates | | | 11.5 | 10.5 | 8.6 |

*unit for ingredients is grams.

As is shown in the above test results, by introducing a peroxide into the two-part epoxy-thiol based adhesives, desirable control on gel time was achieved. Depending on the amounts of peroxide added, the gel times of the adhesive are adjustable in a wide range from 5 min to more than 24 h.

Using peroxide additive for delaying gel time in the epoxy-thiol curing systems is a total innovation and the effects are rather surprising. This finding together with the present invention will have a deep influence on design of the future epoxy-thiol based adhesives. For example, it can be used to design a series of specially products with different gel time for satisfying the requirements from customers.

While the invention has been illustrated and described in typical embodiments, it is not intended to be limited to the details shown, since various modifications and substitutions are possible without departing from the spirit of the present invention. As such, modifications and equivalents of the invention herein disclosed may occur to persons skilled in the art using no more than routine experimentation, and all such modifications and equivalents are believed to be within the spirit and scope of the invention as defined by the following claims.

What is claimed is:

1. An epoxy adhesive comprising at least two parts, which includes
    a first part A comprising at least one epoxy resin containing two or more epoxy groups in one molecule, and
    a second part B comprising at least one thiol curing agent, wherein at least one peroxide containing a —O—O— structure is comprised in part A, part B or if present a third separate part C, wherein
    the first part A comprises 100 parts by weight of an epoxy resin containing two or more epoxy groups in one molecule;
    the second part B comprises 110 to 120 parts by weight of a thiol curing agent,
    wherein 0.03 to 3 parts by weight of a peroxide containing a —O—O— structure is present in at least one of part A, part B or a separate part C.

2. The epoxy adhesive of claim 1, wherein 0.05 to 5 parts by weight of a curing accelerator is present in at least one of part A, part B or a separate part C.

3. The epoxy adhesive of claim 1, wherein the first part comprises 100 parts by weight of an epoxy resin containing two or more epoxy groups in one molecule; 0.2 to 2 parts by weight of a peroxide containing a —O—O— structure; 6 to 7 parts by weight of silane, and 4 to 5 parts by weight of thixotropic agent; and the second part comprises 113 to 118 parts by weight of a thiol curing agent, 0.2 to 5 parts by weight of an accelerator, and 12 to 16 parts by weight of filler.

4. The epoxy adhesive of claim 1, wherein the peroxide has a formula of R1-O—O—R2, wherein R1 and R2 are each independently selected from hydrogen atom, an alkyl group of 1 to 10 carbon atoms and aromatic group including one or more phenyl group(s).

5. The epoxy adhesive of claim 1, wherein the thiol curing agent contains one or more —R3-SH groups in one molecule, R3 is an alkylene group including 2 to 16 carbon atoms or an aromatic group.

* * * * *